United States Patent [19]

Chan

[11] Patent Number: 5,251,469

[45] Date of Patent: Oct. 12, 1993

[54] CALIBRATION SYSTEM

[75] Inventor: Thomas J. Chan, Arcadia, Calif.

[73] Assignee: Rockwell International Corporation, Seal Beach, Calif.

[21] Appl. No.: 692,435

[22] Filed: Apr. 29, 1991

[51] Int. Cl.⁵ .......................................... G01D 18/00
[52] U.S. Cl. .................... 73/1 DV; 73/866.4
[58] Field of Search .................. 73/1 DV, 1 R, 866.4, 73/572, 1 D; 367/13; 376/249

[56] References Cited

U.S. PATENT DOCUMENTS

| | | | |
|---|---|---|---|
| 3,730,121 | 5/1973 | Supernaw | 324/601 X |
| 4,043,176 | 8/1977 | Graham | 73/1 DV |
| 4,106,345 | 8/1978 | Saunders et al. | 73/865.6 |
| 4,462,362 | 7/1984 | Bonitz et al. | 73/35 KX |
| 4,473,830 | 9/1984 | Piatt et al. | 346/75 |
| 4,563,756 | 1/1986 | Assard | 367/13 |
| 4,594,692 | 6/1986 | Read et al. | 73/1 DVX |
| 4,908,800 | 3/1990 | DiLammo | 367/13 |
| 4,959,992 | 10/1990 | Gentlos | 73/1 DV |
| 5,010,525 | 4/1991 | Skinner et al. | 367/13 |
| 5,070,843 | 12/1991 | Komurasaki | 73/1 DVX |

OTHER PUBLICATIONS

Rockwell International publication entitled "Vibration and Loose Parts Monitoring System", publication No. ESG-83-5, 1983, 54 pages.

Primary Examiner—Tom Noland
Attorney, Agent, or Firm—H. Fredrick Hamann; Harry B. Field; Steven E. Kahm

[57] ABSTRACT

A calibration system includes a transducer 36 positioned proximate to a physical disturbance monitoring system sensor 20. A test signal generator 34 causes the transducer 36 to produce an acoustic signal simulating a physical disturbance proximate to the sensor 20. The output of the sensor 20 responsive to the acoustics simulation signal may be compared to a predetermined reference signal to verify the calibration of the sensor 20.

12 Claims, 2 Drawing Sheets

CALIBRATION SYSTEM

BACKGROUND OF THE INVENTION

1. Field of the Invention

The present invention relates to physical disturbance monitoring systems, and more particularly, to calibration systems for such monitoring systems.

2. Description of Related Art

In a variety of hostile environments such as the inside of the containment vessel of a nuclear reactor, the need has arisen for systems to monitor the operation of apparatus in the absence of direct human supervision. Such monitoring systems typically include one or more sensors which are placed in physical proximity to the particular apparatus being monitored. Nuclear reactors often utilize a vibration and acoustic monitoring system which has a plurality of accelerometers coupled to various structures within the containment vessel of the nuclear reactor. These accelerometers can detect unusual or unexpected noises, vibrations and other physical disturbances which might be caused by malfunctioning machinery.

In order for the outputs of the sensors to be correctly interpreted, it is often necessary to periodically calibrate the sensors. Previously, monitoring system accelerometers have been calibrated using a mechanical calibration device which applies an impact force adjacent to the sensor. This operation is usually performed manually by a technician and can be a very time consuming task for monitoring systems having a large number of accelerometers. In addition, where the accelerometers are located in a hostile environment such as the radioactive interior of a containment vessel, the calibration operation can be hazardous, requiring the technicians to enter the containment vessel wearing protective radiation suits.

SUMMARY OF THE INVENTION

It is an object of the present invention to provide an improved system for calibrating physical disturbance monitoring systems, particularly in a manner requiring a relatively uncomplicated electronic arrangement.

These and other objects and advantages are achieved by, in accordance with a preferred embodiment of the present invention, a calibration system which includes a transducer positioned proximate to a monitoring system sensor, and a test signal generator which causes the transducer to produce an acoustic signal simulating a physical disturbance proximate to the sensor. In the illustrated embodiment, the output of the sensor in response to the acoustic simulation signal may then be compared to a predetermined reference signal to verify the calibration of the sensor. As will be made more clear in connection with the following detailed description, such an arrangement allows frequent calibrations of the system without exposing personnel to radiation or other hazards. In addition, the calibration system requires no moving mechanical parts for increased reliability.

DETAILED DESCRIPTION OF THE DRAWINGS

Figure 1:
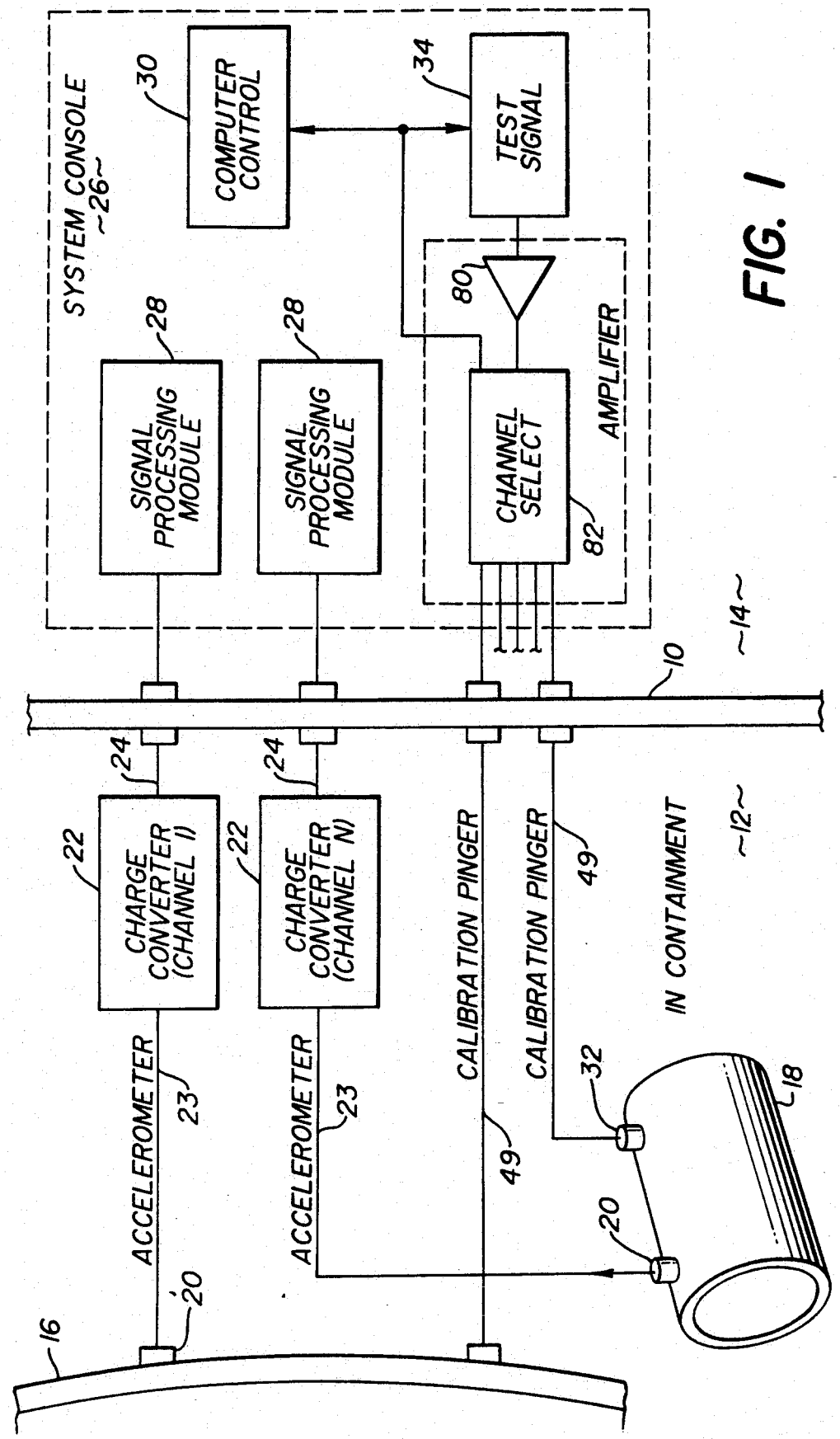
FIG. 1 is a schematic block diagram of a calibration system in accordance with a preferred embodiment of the present invention.

FIG. 1 shows a schematic block diagram of a calibration system in accordance with a preferred embodiment of the present invention. To illustrate the operation of the calibration system, a vibration and acoustic monitoring system is also depicted. In the illustrated embodiment, the vibration and acoustic monitoring system is a Vibration and Loose Parts Monitoring System presently being marketed by the Rocketdyne division of Rockwell International. However, it should be appreciated that the calibration system of the present invention may be utilized with a variety of other physical disturbance monitoring systems.

FIG. 1 also shows a partition wall 10 which separates a hostile environment 12 containing the apparatus being monitored, from a non-hostile environment 14 in which human operators may safely monitor the apparatus. In the illustrated embodiment, the wall 10 represents a containment vessel for a nuclear reactor which is represented by a reactor wall 16 and a reactor conduit 18. The monitoring system of FIG. 1 has a plurality of channels, each channel having an accelerometer 20 which senses physical disturbances in the reactor apparatus. Each accelerometer 20 is attached to a portion of the reactor apparatus such as the reactor wall 16 and the reactor conduit 18.

In response to a physical disturbance, such as a vibration or a noise generated by a loose part, a mass within the accelerometer 20 reacts upon a piezoelectric crystal, generating an electrical charge. Each monitoring system channel has a charge converter 22 which is coupled by an accelerometer cable 23 to the output of the associated accelerometer 20, and converts the charge from the accelerometer into a usable electrical signal. A system cable 24 routes the output signal of each charge converter 22 through the partition wall 10 to a system console 26 which contains signal processors, data storage devices and various output and display devices of the monitoring system. In the Rockwell International V&LPM system, a signal processing module 28 coupled to each charge converter 22 performs signal amplification, filtering and signal conversions. Analog threshold-crossing circuitry of each module 28 compares the processed output signals of the sensors to predetermined values or set points. Alarms are triggered when set points are exceeded.

The system console 26 includes a high resolution color monitor, an FM tape recorder, a laser printer (not shown) and a system computer control 30 which includes both floppy and hard disk drives and a data acquisition and analysis (DAS) system to digitize the buffered analog outputs of the signal processing modules 28. The digitized data is fed to a cyclic memory of the DAS system. In the event a set point is exceeded, the signal processing module 28 sends a trigger signal to the computer-based DAS to capture the pre-alarm data from the cyclic memory for analysis. Simultaneously, the tape recorder is commanded on and the appropriate data channels are routed to the tape recorder for collection.

As mentioned above, in order to calibrate such a monitoring system, previously it was often necessary for a technician to enter the containment vessel wearing a radiation suit. Once inside the containment vessel, the technician located each accelerometer of the monitoring system in turn and activated a manual calibration device which had been placed on the apparatus structure adjacent to the accelerometer.

When activated, the manual calibration device physically strikes the structure to induce an impact to simulate a loose part striking the structure. The motion produced by the activation of the manual calibration device is sensed by the accelerometer, the output of which is converted to an electrical output signal by the associated charge converter 22. The system console 26 processes the test data signals from the charge converter. By comparing the test data to a predetermined standard or prior test data, the accelerometer can be calibrated.

It should be appreciated that where the monitoring system has a number of such accelerometers, a manual calibration process can be quite time consuming. This is particularly true in applications such as nuclear reactors where it is recommended that the sensors be calibrated on a regular basis. Still further, a manual calibration process can require the technician to enter a hazardous environment which if done on a frequent basis can expose the technician to an increased risk of accidental exposure to radiation.

The present invention provides a method and apparatus for automatically calibrating the monitoring system sensors, which eliminates the need for a technician to enter the containment vessel and manually activate calibration devices. Instead, a calibration system in accordance with the present invention includes an electronic "pinger" 32 which can be permanently mounted in close physical proximity to the sensor to be calibrated. As will be explained in greater detail below, each pinger 32 includes a piezoelectric transducer 36 (FIG. 2) which is coupled to the output of a test signal generator 34 included within the system console 26. The test signal generator 34 provides a test signal to the transducer of the pinger 32, which stimulates the transducer to create an acoustic signal simulating a physical disturbance such as the impact of a loose part. The sensor of each monitoring system channel may be provided a pinger 32 wherein each pinger may be activated in turn to calibrate each of the monitoring system channels. In this manner, the need for a technician to enter the containment vessel on a regular basis to calibrate the monitoring system sensors has been eliminated.

Figure 2:
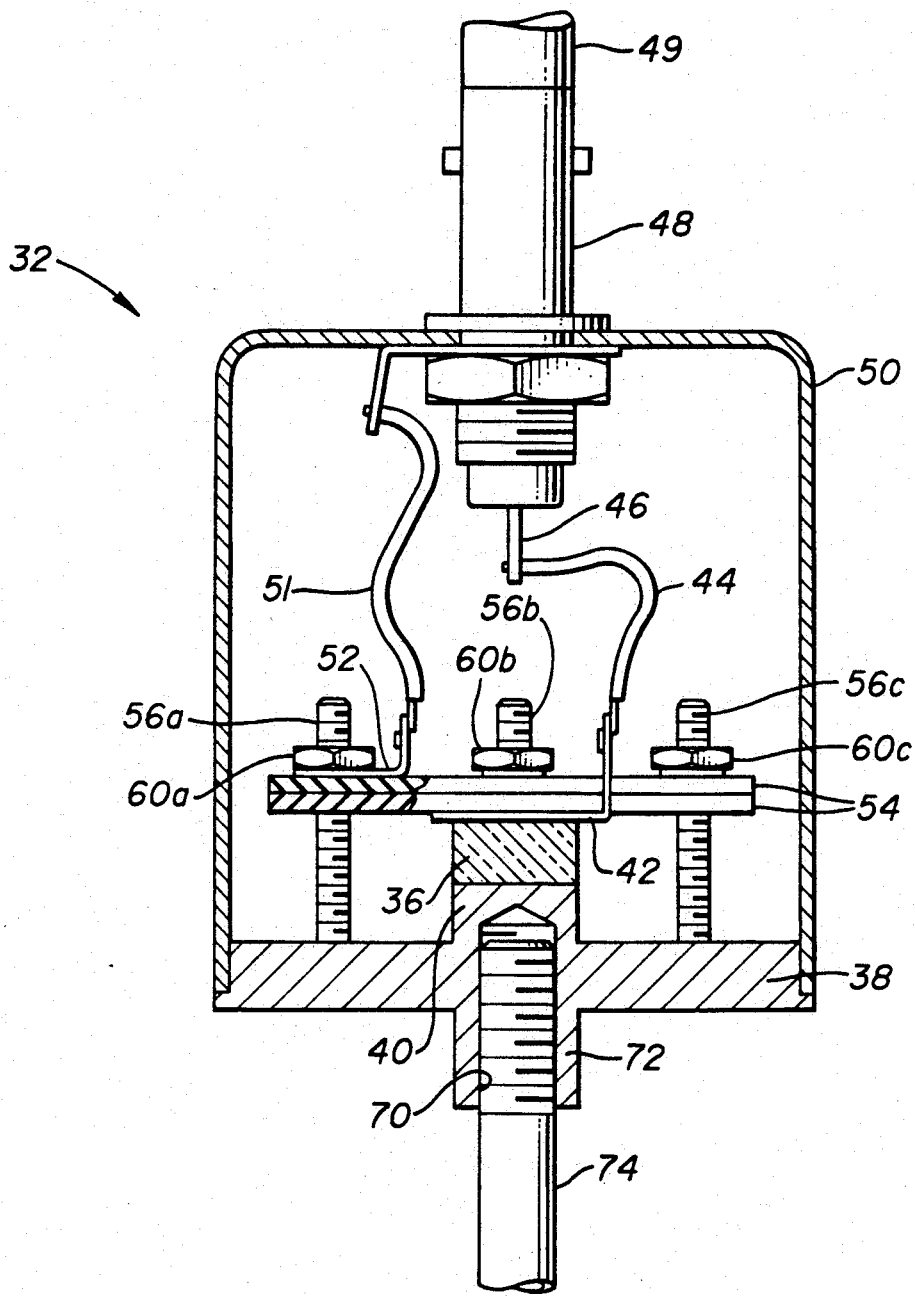
FIG. 2 is a cross-sectional view of a transducer device utilized in the system of FIG. 1.

FIG. 2 shows a typical pinger 32 in greater detail. The pinger 32 of the illustrated embodiment is generally cylindrical and includes a cylindrical transducer 36 carried by a generally disc-shaped metal base 38. In the illustrated embodiment, the transducer 36 is a PZT4 piezoelectric crystal which is polarized so as to have positive and negative faces. The negative face of the crystal 36 abuts a central raised cylindrical portion 40 of the metal base 38. The positive face of the crystal 36 abuts a gold contact 42 which is coupled by an electrical wire 44 to the center conductor 46 of a BNC type connector 48. The electrical stimulation signals which induce the crystal 36 to produce noises simulating physical disturbances are supplied to the pinger 32 via a cable 49 connecting the BNC connector 48 to the system console 26 (FIG. 1) in the control room 14. The BNC connector 48 is mounted on a metal enclosure 50 enclosing the pinger 32.

The outer (ground) conductor of the connector 48 is connected by second electrical wire 51 to a ground contact 52 disposed on a pair of insulation boards 54 overlying the gold contact 42. Passing through the insulation boards 54 are three threaded bolts 56a-56c which are welded at one end to the metal base 38. The ground contact 52 is electrically connected via the threaded bolt 56a and the metal base 38 to the negative face of the crystal 36.

By tightening nuts 60a-60c on the threaded bolts 56a-56c, respectively, the insulation boards forcefully press the crystal 36 against the raised central portion 40 of the metal base 38 to provide good acoustic coupling between the crystal 36 and the metal base 38. The metal base 38 has a threaded bore 70 drilled and tapped into a lower central raised cylindrical portion 72 of the metal base 38. A rod-shaped waveguide 74 threaded into the bore 70 of the metal base 38 couples the acoustic vibrations induced in the crystal 36 to the mounting structure such as the wall 16 or conduit 18 of the reactor of FIG. 1.

In the illustrated embodiment, the test signal generator 34 of FIG. 1 is a tape recorder which plays back a prerecorded test signal. The prerecorded signal may be created during the initial installation of the calibration system. For each channel of the monitoring system, a mechanical impact device is activated adjacent the sensor of the channel, creating an acoustic reference signal which is sensed by the sensor. The resulting output signal of the charge converter 22 of the channel is recorded by the test signal recorder 34. This recorded signal may then be played back by the recorder 34, amplified by an amplifier 80 and transmitted by a channel select switch 82 to the associated pinger 32. The amplified prerecorded electrical test signal causes the pinger 32 to generate an acoustic test signal which in this case is a sound similar to that caused by the mechanical impact device. More specifically, the prerecorded test signal stimulates the piezoelectric crystal 36 of the pinger 32, inducing vibrations which generate a simulated impact noise through the pinger waveguide 72 to the accelerometer of the channel being calibrated. The system console 26 compares the output of the associated charge converter 22 to the previously recorded output of the charger converter resulting from the activation of the mechanical impact device, and computes a correlation factor between the two output signals representing the sound of the pinger and the sound of the manual calibration device sound, respectively. Once this correlation has been established, sending the same prerecorded stimulation test signal to the pinger and comparing the sensor response to the simulated noise signal serves to verify the in-calibration (or out-of-calibration) status of the channel. In addition to the above-described electrical calibration test signal, a variety of signals can be used to excite the pinger, including white noise to verify the filter response of the signal processing modules. Various known function generators may also be used as the signal generator 34 for this purpose.

Preferably, the calibration should be performed on a periodic and automatic basis, under programmed control of the system computer. Records of the results can be stored in the computer hard disk, permitting trend plots to be generated. Analysis of the trend plots allows early detection and correction of calibration drift on a channel.

As an alternative to calibrating the pingers inside the containment vessel, it should be appreciated that a representative pinger and an associated accelerometer can be installed outside the containment vessel. The mechanical impact device can be activated next to this outside accelerometer to generate the pinger stimulation signal for recording. In this manner, the calibration system may be initialized without exposure to radiation.

It is to be understood that what has been described is merely illustrative of the principles of the invention and that numerous arrangements in accordance with this invention may be devised by one skilled in the art without departing from the spirit and scope thereof. As such, the scope of the invention should not be limited by the particular embodiments herein described but should be defined only by the appended claims and equivalents thereto.

What is claimed is:

1. A test system for use with a physical disturbance monitoring system having one or more sensors for sensing a physical disturbance, comprising:

transducer means responsive to electrical stimulation signals for producing physical vibrations simulating vibrations caused by a physical disturbance, said transducer means being positioned proximate to a physical disturbance sensor; and test signal stimulation means for providing an electrical stimulation signal to the transducer means so as to cause the transducer means to produce physical vibrations proximate to the sensor, wherein the electrical stimulation signal is derived from the output of a physical disturbance sensor.

2. The test system of claim 1 wherein the simulation test signal simulates loose parts impact noise.

3. The test system of claim 1 wherein the transducer means includes a piezoelectric crystal.

4. The test system of claim 1 further comprising a waveguide coupled to the output of the transducer means.

5. The test system of claim 1 wherein the test signal stimulation means includes a playback means for playing back a prerecorded electrical signal.

6. The test signal of claim 5 wherein the prerecorded signal is the recorded output of a physical disturbance sensor.

7. The test signal of claim 5 wherein the physical vibrations produced by the transducer means are an acoustic signal simulating acoustic noise caused by a physical disturbance.

8. The test system of claim 1 wherein the test signal stimulation means further comprises:

a mechanical device having moving parts for physically disturbing when activated, a physical disturbance sensor so as to cause the physical disturbance sensor to produce a mechanical reference sensor output signal; and recording means for recording the output of a physical disturbance sensor when the mechanical device is activated.

9. The test system of claim 8 wherein the electrical stimulation signal of the test signal stimulation means is derived from the recorded output of the physical disturbance sensor when disturbed by the mechanical device.

10. The test system of claim 9 wherein application of the electrical stimulation signal to the transducer means by the test signal stimulation means causes the sensor proximate to the transducer means to produce a test sensor output signal;

the test system further comprising means for comparing the test sensor output signal to the mechanical reference sensor output signal and for computing a correlation factor between the two sensor output signals.

11. The test system of claim 10 wherein application of the electrical stimulation signal again to the transducer means by the test signal stimulation means causes the sensor proximate to the transducer means to produce a second test sensor output signal;

the test system further comprising means for comparing the second test sensor output signal to the mechanical reference sensor output signal using the computed correlation factor to test the sensor.

12. A test system for use with a malfunction monitoring system having one or more sensors for sensing malfunctioning equipment, comprising:

a mechanical device having moving parts for simulating when activated, an equipment malfunction in the vicinity of a malfunction sensor so as to cause the malfunction sensor to produce a mechanical malfunction reference sensor output signal;

recording means for recording the output of the malfunction sensor when the mechanical device is activated; and transducer means responsive to electrical stimulation signals for producing acoustic noise simulating acoustic noise caused by an equipment malfunction, said transducer means being positioned proximate to a malfunction sensor;

test signal stimulation means for providing an electrical stimulation signal derived from the recorded output of the malfunction sensor when disturbed by the mechanical device, and for applying the electrical stimulation signal to the transducer means to cause the sensor in the vicinity of the transducer means to produce an acoustic test sensor output signal; and means for comparing the acoustic test sensor output signal to the mechanical reference sensor output signal and for computing a correlation factor between the two sensor output signals;

wherein application of the electrical stimulation signal again to the transducer means by the test signal stimulation means causes the sensor proximate to the transducer means to produce a second acoustic test sensor output signal; and wherein the comparing means further has means for correlating the second acoustic test sensor output signal to the mechanical reference sensor output signal using the computed correlation factor and for comparing the correlated second acoustic test sensor output signal and mechanical reference sensor output signal to test the sensor.

* * * * *